Patented Feb. 21, 1950

2,497,927

UNITED STATES PATENT OFFICE 2,497,927

RESINOUS FUNGICIDAL COMPOSITIONS

Herman A. Bruson, Rydal, Pa., assignor, by mesne assignments, to Rohm & Haas Company, Philadelphia, Pa., a corporation of Delaware No Drawing. Application January 16, 1948,
Serial No. 2,812

5 Claims. (Cl. 117—138.5)

1

This invention relates to novel resins having fungicidal properties. It relates to the preparation of fungicidal resinous materials comprising copolymers of haloaryl allyl or haloaryl methallyl ethers and maleic anhydride and/or chloromaleic anhydride. It also relates to the use of such fungicidal resins as mildew-proofing agents on pervious and fibrous materials such as wood, textiles, papers, and leather. More specifically, it relates to the copolymers of maleic anhydride and/or chloromaleic anhydride and ethers having the general formula $Ar—(O—CH_2CR=CH_2)_n$ in which Ar represents an aromatic monocyclic or dicyclic radical of the benzene or naphthalene series containing one to five halogen atoms, R is either a hydrogen atom or a methyl group, and $n$ is a whole number of value one or two. Thus, the ethers are those in which the aliphatic portion is an allyl or methallyl radical.

The ethers involved in this invention are exemplified by the following: 2,4-dichlorophenyl allyl ether, 2,4-dibromophenyl methallyl ether, 2,4,6-tribromophenyl allyl ether, 2,4,6-trichlorophenyl methallyl ether, 1,3,6-tribromonaphthyl allyl and methallyl ethers, the allyl and methallyl ethers of 2-chloro-p-phenyl phenol, pentachlorophenyl allyl and methallyl ethers, p-chlorothymol allyl ether, p-bromothymol methallyl ether, 6-halo-m-cresyl allyl ether, the diallyl and dimethallyl ethers of tetrachlorohydroquinone, 2-chloro-p-benzylphenyl allyl ether, the diallyl and dimethallyl ethers of 2,6,2',6'-tetrachloro-1,1'-dihydroxyl diphenyl-2-propane. In addition to the halo substituents which must be present on the benzene or naphthalene ring of the ether, other substituents may also be present if desired. Such substituents are typified by the following groups: Nitro, sulfonic acid, sulfonate, carboxyl, alkoxy, phenoxy, aralkyl, aryl, and alkyl groups. The allyl and methallyl ethers of halogenated phenols containing an alkyl substituent in the para position are particularly valuable, for example, the allyl and methallyl ethers of p-n-butylphenol, p-sec.-amylphenol, p-tert.-amylphenol, and p-diisobutylphenol, all of which contain one to four halogen atoms in the benzene ring. Thus, it is apparent that the groups represented by Ar in the above general formula are halogenated cyclic radicals of the benzene and naphthalene series. Preference, however, is definitely given to those groups containing only carbon, hydrogen, and halogen; that is, to the halogenated hydrocarbon radicals. Although the above examples are limited for the sake of brevity to the chlorinated and brominated ethers, it is understood that the fluorine and iodine counterparts are equally operable.

The copolymers are prepared by heating the ether together with maleic anhydride and/or chloromaleic anhydride in the presence of an organic peroxidic catalyst. It is recommended that the polymerizable materials be copolymerized in an inert solvent; and, for this purpose, benzene, toluene, xylene, dioxane, and the like, are suggested.

Suitable peroxidic catalysts are those commonly employed in the polymerization of ethenoid materials such as styrene, acrylic and methacrylic monomers, vinyl compounds, et cetera, and are exemplified by benzoyl peroxide, lauroyl peroxide, cumene hydroperoxide, tert.-butyl hydroperoxide, and similar compounds which yield oxygen.

The products of this invention are resinous, fungicidal agents comprising the copolymer or heteropolymer formed by reacting together, under the influence of heat, equimolar amounts of the ether which is described above and the anhydride of maleic or chloromaleic acid. While the two monomeric compounds polymerize in substantially equimolecular ratio, a greater proportion of either monomer can be employed for the sake of directing the course and rate of polymerization and the excess thereof later separated from the polymer.

For application, particularly as mildewproofing agents, to textiles and other fibrous or pervious materials, such as leather, wood, paper, and wallboard, which are subject to fungal and bacterial defacement and decomposition, the resins of this invention are preferably dissolved in an aqueous solution of a nitrogenous base such as ammonia, morpholine, monoethanolamine, diethanolamine, triethanolamine, or ethylene diamine. Presumably a soluble amine salt of the polymer is formed. The solution is then applied to the pervious material, preferably to impregnate said pervious material, and the resin is cured, that is, rendered insoluble and substantially infusible, by the application of heat, with or without the use of formaldehyde. In many cases, the heating treatment may be omitted, since the resin becomes insoluble merely by evaporation of the water and loss of the nitrogenous base. The value of this invention resides in the fact that the materials are not only fungicidal, fungistatic, and/or bactericidal, but they also have the characteristic permanence, durability, and stability of polymeric and resinous bodies.

The following examples serve to illustrate this invention.

Example 1

A mixture consisting of fifty grams of p-chlorophenyl allyl ether, one hundred grams of xylene, one gram of benzoyl peroxide, and thirty-two grams of maleic anhydride was boiled under reflux for eight hours. Then one additional gram of benzoyl peroxide was added, and the mixture was refluxed for nine hours longer. Upon removal of the solvent by evaporation in vacuo, there was obtained eighty grams of a viscous oil. This oil was subjected to steam distillation to remove unreacted starting material. The residual product, after being dried in vacuo at 100° C., was a brittle, amber-colored resin. It was soluble in warm ammonium hydroxide or in a 20% aqueous morpholine solution, but it was only slightly soluble in 10% sodium hydroxide solution.

Example 2

A mixture of eighty-one grams of 2,4-dichlorophenyl allyl ether, thirty-nine grams of maleic anhydride, one gram of benzoyl peroxide, and one hundred grams of benzene was stirred and boiled under reflux for six hours. An additional gram of benzoyl peroxide was added, and the refluxing was continued for nine hours longer. The solvent was removed by evaporation in vacuo. The residual viscous oil, which amounted to 120 grams, was steam-distilled until no more oil droplets were condensed; and the sticky resin remaining in the still pot was decanted from the hot water, washed, and dried. It formed a brittle resin contining 21.4% of chlorine and was insoluble in 10% aqueous sodium hydroxide or potassium hydroxide but was readily soluble in 10% aqueous morpholine. A 25% aqueous solution of the morpholine salt of the resin was diluted with more water to give a solution containing one part of the salt in four hundred parts of water. This solution was found to be bactericidal. Paper impregnated with 4.5% by weight of this resin and dried at 100°–150° C. showed improved wet strength and marked mildew resistance.

Example 3

A mixture of seventy-one grams of 2,4,6-trichlorophenyl allyl ether, twenty-nine grams of maleic anhydride, and one gram of benzoyl peroxide was stirred with one hundred grams of xylene and boiled under reflux for five hours. An additional gram of benzoyl peroxide was added, and the boiling was continued for ten hours longer. The dark solution was steam-distilled until no more oil condensed. The residual resin was dissolved in acetone and dried in vacuo. It formed a dark hard resin which was soluble in aqueous 20% morpholine solution. This resin had definite fungicidal properties.

Example 4

A mixture of ninety-two grams of pentachlorophenyl allyl ether, 29.4 grams of maleic anhydride, two hundred cc. of xylene, and two grams of benzoyl peroxide was refluxed for forty-eight hours. The solvent was evaporated off under reduced pressure, and the residual viscous oil was subjected to vacuum steam distillation until no more oily droplets distilled. The residual product, after being washed and dried, was a dark, tough resin containing 31.5% of chlorine by analysis. It was soluble in a 20% aqueous diethanolamine solution. This diethanolamine solution was used to impregnate wool which, on being dried, was found to be mothproof. It was also employed in the impregnation and rotproofing of wood.

The diethanolamine solution was tested in vitro against *Aspergillus oryzae*, *Aspergillus niger*, and *Bacillus subtilis* on potato-dextrose-agar at 30° C. At a concentration of 1:100, the resin completely inhibited the growth of the organisms. At a concentration of 1:1000, the resin completely inhibited the growth of *Bacillus subtilis* and retarded the growth of the fungi for at least forty hours.

Example 5

A mixture of 50.6 grams of p-chlorophenyl allyl ether, forty-four grams of monochloromaleic anhydride, five grams of benzoyl peroxide, and one hundred grams of benzene was boiled and stirred under reflux for twenty-nine hours. The benzene was then removed under reduced pressure, and the 94.5 grams of hard, clear, orange resin was then subjected to vacuum steam distillation until no oily droplets distilled. Water was decanted from the resin, and the latter was dissolved in acetone and dried in vacuo. Seventy-two grams of a brilliant orange resin was obtained which dissolved readily in concentrated ammonium hydroxide solution and in 20% aqueous solutions of morpholine and ethanolamine. All of these solutions exhibited fungistatic properties.

Example 6

By the procedure of Example 5, a mixture of seventy grams of 2,4-dichlorophenyl allyl ether, forty-four grams of monochloromaleic anhydride, five grams of benzoyl peroxide, and one hundred grams of benzene was refluxed for twenty-four hours and was then steam-distilled and dried. A clear, hard, orange resin was obtained which dissolved readily in 20% aqueous solution of morpholine and ethanolamine.

In the same manner as outlined above, resinous products having fungicidal and/or bactericidal properties are obtained by copolymerizing other haloaryl allyl or methallyl ethers and maleic anhydride and/or chloromaleic anhydride.

I claim:

1. A resinous fungicidal agent comprising the product of copolymerizing substantially equimolar amounts of an anhydride from the class consisting of maleic and chloromaleic anhydrides and an ether having the general formula

$$\text{Ar}-(\text{O}-\text{CH}_2\text{CR}=\text{CH}_2)_n$$

in which R represents a member of the class consisting of a methyl group and a hydrogen atom, $n$ is a whole number having a value of one to two, and Ar is a chlorinated aromatic hydrocarbon radical of the benzene and naphthalene series containing one to five halogen atoms.

2. A resinous fungicidal agent comprising the product of copolymerizing substantially equimolar amounts of maleic anhydride and 2,4-dichlorophenyl allyl ether.

3. A resinous fungicidal agent comprising the product of copolymerizing substantially equimolar amounts of maleic anhydride and 2,4,6-trichlorophenyl allyl ether.

4. A resinous fungicidal agent comprising the product of copolymerizing substantially equimolar amounts of maleic anhydride and pentachlorophenyl allyl ether.

5. The process of mildewproofing pervious fibrous materials which comprises impregnating the materials with an aqueous solution of a nitrogenous base and the product of claim 1 and thereafter drying said impregnated fibrous materials.

HERMAN A. BRUSON.

REFERENCES CITED

The following references are of record in the file of this patent:

UNITED STATES PATENTS

| Number | Name | Date |
|---|---|---|
| 2,047,398 | Voss et al. | July 14, 1936 |
| 2,415,400 | Armstrong | Feb. 11, 1947 |

OTHER REFERENCES

Felton et al. J. Org. Chem., 12, March 1947, pages 298–302.